US011336519B1

(12) United States Patent
Greenwood et al.

(10) Patent No.: US 11,336,519 B1
(45) Date of Patent: May 17, 2022

(54) EVALUATING PLACEMENT CONFIGURATIONS FOR DISTRIBUTED RESOURCE PLACEMENT

(71) Applicant: Amazon Technologies, Inc., Seattle, WA (US)

(72) Inventors: Christopher Magee Greenwood, Seattle, WA (US); Mitchell Gannon Flaherty, Seattle, WA (US); Surya Prakash Dhoolam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 14/643,479

(22) Filed: Mar. 10, 2015

(51) Int. Cl.
*H04L 12/24* (2006.01)
*H04L 41/0816* (2022.01)
*H04L 47/783* (2022.01)

(52) U.S. Cl.
CPC ........ *H04L 41/0816* (2013.01); *H04L 47/783* (2013.01)

(58) Field of Classification Search
CPC . H04L 41/0816; H04L 41/0818; H04L 67/34; H04L 47/78; H04L 47/827; H04L 47/76; H04L 47/783; H04L 47/821; H04L 29/06; H04L 41/0863; H04L 41/0866; H04K 47/70; G06F 9/45533; G06F 9/50; G06F 11/3006; G06F 2212/00; G06F 2212/7202; G06F 9/5027; G06F 9/5044;
(Continued)

(56) References Cited

U.S. PATENT DOCUMENTS 5,818,729 A * 10/1998 Wang ................ G06F 30/392
716/122
6,075,571 A * 6/2000 Kuthyar ................. H04N 7/15
348/14.07

(Continued)

FOREIGN PATENT DOCUMENTS

CN 102057367 5/2011
CN 102821158 12/2012
(Continued)

OTHER PUBLICATIONS

Rochman et al., "Resource Placement and Assignment in Distributed Network Topologies", 2013.*

(Continued)

*Primary Examiner* — Ondrej C Vostal
(74) *Attorney, Agent, or Firm* — Robert C. Kowert; Kowert, Hood, Munyon, Rankin & Goetzel, P.C.

(57) ABSTRACT

A distributed system may implement evaluating placement configurations for distributed resource placement. Placement requests for a partition of a distributed resource may be received. An evaluation of prospective placement configurations of the distributed resource is performed that locates the partition at different resource hosts. In some embodiments, placement configurations may be analyzed with respect to infrastructure zone locality. Multiple infrastructure zone localities may be analyzed and combined to evaluate prospective placement configurations. Prospective placement configurations may be analyzed with respect to other criteria, such as resource host utilization data. Based, at least in part, on the evaluation of the prospective placement, a resource host is identified for placing the partition.

20 Claims, 8 Drawing Sheets

(58) Field of Classification Search
CPC ............. G06F 9/5061; G06F 2209/505; G06F 9/45558; G06F 2212/2515; G06G 3/0631
USPC ...................................................... 709/221
See application file for complete search history.

(56) References Cited

U.S. PATENT DOCUMENTS

| | | | | |
|---|---|---|---|---|
| 6,470,387 | B1 * | 10/2002 | Fischer | H04L 29/06 709/224 |
| 6,922,724 | B1 * | 7/2005 | Freeman | G06F 9/505 709/223 |
| 6,978,232 | B1 * | 12/2005 | Tobler | H04L 67/02 703/21 |
| 6,991,148 | B2 * | 1/2006 | Kurita | H05K 3/005 228/110.1 |
| 7,203,738 | B1 * | 4/2007 | McGill | G06F 8/60 709/219 |
| 7,502,859 | B2 * | 3/2009 | Inoue | G06F 9/5044 702/188 |
| 7,509,671 | B1 | 3/2009 | Bedell et al. | |
| 7,644,051 | B1 * | 1/2010 | Moore | G05B 17/02 706/21 |
| 7,725,496 | B2 * | 5/2010 | Paval | G06F 16/83 707/802 |
| 7,860,920 | B2 * | 12/2010 | Boivie | H04L 12/1886 709/201 |
| 8,087,025 | B1 * | 12/2011 | Graupner | G06F 9/505 718/104 |
| 8,095,662 | B1 * | 1/2012 | Lappas | G06Q 10/06 709/226 |
| 8,095,929 | B1 | 1/2012 | Ji et al. | |
| 8,230,069 | B2 | 7/2012 | Korupolu | |
| 8,280,952 | B1 * | 10/2012 | Parsons | H04L 61/302 705/14.71 |
| 8,291,416 | B2 * | 10/2012 | Cartales | G06F 9/5083 718/1 |
| 8,307,444 | B1 * | 11/2012 | Mayer | H04L 41/22 726/25 |
| 8,321,862 | B2 | 11/2012 | Swamy et al. | |
| 8,346,681 | B2 * | 1/2013 | Lauritsen | G06N 5/042 706/11 |
| 8,424,059 | B2 | 4/2013 | Kwok et al. | |
| 8,452,819 | B1 * | 5/2013 | Sorenson, III | G06F 3/0611 707/809 |
| 8,667,495 | B1 * | 3/2014 | Brandwine | H04L 41/0806 718/104 |
| 8,738,972 | B1 * | 5/2014 | Bakman | G06F 11/0712 714/47.1 |
| 8,762,525 | B2 * | 6/2014 | Devarakonda | G06F 9/5072 709/224 |
| 8,843,935 | B2 * | 9/2014 | Hegdal | G06F 11/0712 718/104 |
| 8,850,442 | B2 * | 9/2014 | Davis | G06F 9/5077 718/104 |
| 8,868,766 | B1 * | 10/2014 | Theimer | H04L 67/32 709/229 |
| 8,868,963 | B2 * | 10/2014 | Fawcett | G06F 9/5061 709/223 |
| 8,914,517 | B1 * | 12/2014 | Shpilyuck | G06F 9/5083 709/226 |
| 8,924,539 | B2 | 12/2014 | Ferris et al. | |
| 8,938,542 | B2 * | 1/2015 | Lynch | H04L 47/62 709/226 |
| 8,954,978 | B1 * | 2/2015 | Brandwine | H04L 47/783 718/104 |
| 9,009,542 | B1 * | 4/2015 | Marr | H04L 43/0817 714/47.3 |
| 9,032,077 | B1 * | 5/2015 | Klein | H04L 29/08 370/395.21 |
| 9,098,333 | B1 * | 8/2015 | Obrecht | G06F 11/3442 |
| 9,559,914 | B1 * | 1/2017 | Groenewald | H04L 41/145 |
| 9,626,222 | B2 * | 4/2017 | Puttaswamy Naga | G06F 9/5027 |
| 9,794,136 | B1 * | 10/2017 | Fakhouri | H04L 67/10 |
| 9,992,304 | B2 * | 6/2018 | Stephens | H04L 67/00 |
| 10,091,072 | B2 * | 10/2018 | Cropper | G06F 9/45558 |
| 10,333,789 | B1 * | 6/2019 | Dippenaar | H04L 67/18 |
| 10,356,169 | B1 * | 7/2019 | Mistry | H04L 67/1097 |
| 10,956,230 | B2 * | 3/2021 | Gopalan | G06F 9/5088 |
| 2002/0112249 | A1 * | 8/2002 | Hendricks | H04N 21/6547 725/136 |
| 2002/0157075 | A1 * | 10/2002 | Teig | G06F 30/392 716/122 |
| 2003/0058855 | A1 * | 3/2003 | Feyerabend | H04L 29/06 370/389 |
| 2004/0030457 | A1 * | 2/2004 | Bayoumi | H02J 13/0062 700/286 |
| 2004/0030566 | A1 * | 2/2004 | Brooks Rix | G06Q 10/1053 705/321 |
| 2005/0228878 | A1 * | 10/2005 | Anstey | H04L 43/028 709/224 |
| 2005/0240836 | A1 * | 10/2005 | Harmon | G06F 7/728 714/52 |
| 2006/0095917 | A1 * | 5/2006 | Black-Ziegelbein | G06F 9/5083 718/104 |
| 2006/0224805 | A1 | 10/2006 | Pruscino et al. | |
| 2007/0043860 | A1 * | 2/2007 | Pabari | H04L 41/0886 709/224 |
| 2008/0005711 | A1 * | 1/2008 | Scheffer | G06F 30/392 716/122 |
| 2008/0052026 | A1 * | 2/2008 | Amidon | H04N 5/23203 702/104 |
| 2008/0059536 | A1 * | 3/2008 | Brock | G06F 21/10 |
| 2008/0091806 | A1 * | 4/2008 | Shen | G06F 9/5061 709/223 |
| 2008/0271039 | A1 * | 10/2008 | Rolia | G06Q 10/06 718/105 |
| 2009/0263026 | A1 * | 10/2009 | Verne | G06Q 30/0241 382/209 |
| 2009/0327346 | A1 * | 12/2009 | Teinila | G06Q 30/02 |
| 2010/0115049 | A1 * | 5/2010 | Matsunaga | G06F 3/0626 709/216 |
| 2010/0125665 | A1 * | 5/2010 | Simpson | G06F 11/3409 709/224 |
| 2010/0262974 | A1 * | 10/2010 | Uyeda | G06F 9/5077 718/105 |
| 2010/0269109 | A1 * | 10/2010 | Cartales | G06F 9/45558 718/1 |
| 2010/0306382 | A1 | 12/2010 | Cardosa et al. | |
| 2011/0010634 | A1 * | 1/2011 | Hatasaki | G06F 9/5011 715/739 |
| 2011/0099147 | A1 * | 4/2011 | McAlister | G06F 11/2076 707/639 |
| 2011/0208822 | A1 * | 8/2011 | Rathod | G06F 16/9535 709/206 |
| 2011/0225247 | A1 * | 9/2011 | Anantharaman | H04L 65/80 709/206 |
| 2011/0238546 | A1 * | 9/2011 | Certain | G06Q 30/0284 705/34 |
| 2011/0246526 | A1 * | 10/2011 | Finkelstein | G06F 17/30286 707/784 |
| 2011/0252135 | A1 * | 10/2011 | Kudo | G06F 9/5044 709/224 |
| 2011/0276507 | A1 * | 11/2011 | O'Malley | G06Q 30/00 705/321 |
| 2011/0307899 | A1 * | 12/2011 | Lee | G06F 9/5027 718/104 |
| 2012/0239792 | A1 * | 9/2012 | Banerjee | H04L 67/1097 709/223 |
| 2012/0265569 | A1 * | 10/2012 | Gonzalez-Diaz | G06Q 10/0631 705/7.12 |
| 2012/0290460 | A1 * | 11/2012 | Curry, Jr. | G06Q 40/04 705/37 |
| 2012/0303740 | A1 * | 11/2012 | Ferris | G06F 16/278 709/217 |
| 2012/0324070 | A1 * | 12/2012 | Campion | G06F 9/5066 709/223 |

(56) References Cited

U.S. PATENT DOCUMENTS

| | | | |
|---|---|---|---|
| 2013/0090961 A1* | 4/2013 | Smith | G06Q 40/00 705/7.11 |
| 2013/0097601 A1* | 4/2013 | Podvratnik | G06F 8/61 718/1 |
| 2013/0111468 A1* | 5/2013 | Davis | G06F 9/5077 718/1 |
| 2013/0151683 A1* | 6/2013 | Jain | G06F 3/0646 709/223 |
| 2013/0179209 A1* | 7/2013 | Milosevich | G06Q 10/06 705/7.18 |
| 2013/0185414 A1* | 7/2013 | Puttaswamy Naga | H04L 67/16 709/224 |
| 2013/0185436 A1* | 7/2013 | Carlin | G06F 9/5011 709/226 |
| 2013/0198740 A1* | 8/2013 | Arroyo | H04L 41/0806 718/1 |
| 2013/0268672 A1 | 10/2013 | Justafort et al. | |
| 2013/0304925 A1* | 11/2013 | Ferris | G06F 9/5072 709/226 |
| 2013/0311628 A1* | 11/2013 | Kruglick | G06F 8/61 709/223 |
| 2013/0318134 A1* | 11/2013 | Bolik | G06F 3/0607 707/827 |
| 2013/0346967 A1* | 12/2013 | Anand | G06F 9/45558 718/1 |
| 2014/0019964 A1* | 1/2014 | Neuse | G06F 9/45558 718/1 |
| 2014/0019966 A1* | 1/2014 | Neuse | G06F 9/45533 718/1 |
| 2014/0040343 A1* | 2/2014 | Nickolov | H04L 67/1029 709/201 |
| 2014/0059207 A1* | 2/2014 | Gulati | G06F 9/4856 709/224 |
| 2014/0059379 A1* | 2/2014 | Ren | G06F 11/08 714/15 |
| 2014/0095693 A1* | 4/2014 | Apte | H04L 67/1012 709/224 |
| 2014/0122725 A1* | 5/2014 | Batrouni | H04L 67/2842 709/226 |
| 2014/0173738 A1* | 6/2014 | Condry | G06F 21/568 726/25 |
| 2014/0201345 A1* | 7/2014 | Abuelsaad | G06F 21/60 709/223 |
| 2014/0229607 A1* | 8/2014 | Jung | H04L 43/0876 709/224 |
| 2014/0259012 A1* | 9/2014 | Nandlall | H04W 4/003 718/1 |
| 2014/0289194 A1* | 9/2014 | Chan | G06F 9/54 707/620 |
| 2014/0380303 A1* | 12/2014 | Bello | G06F 9/45558 718/1 |
| 2015/0019195 A1* | 1/2015 | Davis | G06F 11/3447 703/17 |
| 2015/0039764 A1* | 2/2015 | Beloglazov | G06F 9/5088 709/226 |
| 2015/0039767 A1* | 2/2015 | Matczynski | H04L 47/70 709/226 |
| 2015/0066929 A1* | 3/2015 | Satzke | G06N 99/005 707/737 |
| 2015/0088827 A1* | 3/2015 | Xu | G06F 3/065 707/634 |
| 2015/0092557 A1* | 4/2015 | Deshmukh | H04L 47/125 370/235 |
| 2015/0106524 A1* | 4/2015 | Lu | H04L 67/16 709/226 |
| 2015/0113144 A1* | 4/2015 | Bauer | H04L 47/70 709/226 |
| 2015/0120931 A1* | 4/2015 | Padala | G06F 9/5027 709/226 |
| 2015/0212840 A1* | 7/2015 | Biran | H04L 47/76 718/1 |
| 2015/0236977 A1* | 8/2015 | Terayama | H04L 43/065 709/224 |
| 2015/0248305 A1* | 9/2015 | Shu | G06F 9/45533 718/1 |
| 2015/0261578 A1* | 9/2015 | Greden | G06F 9/5044 718/1 |
| 2015/0295849 A1* | 10/2015 | Xia | H04L 47/782 370/235 |
| 2015/0341223 A1* | 11/2015 | Shen | G06F 9/5027 709/223 |
| 2015/0355892 A1* | 12/2015 | Glikson | G06F 9/4856 718/1 |
| 2016/0007210 A1* | 1/2016 | Batteram | H04W 16/18 455/449 |
| 2016/0029769 A1* | 2/2016 | Park | A45D 34/045 132/286 |
| 2016/0050129 A1* | 2/2016 | Hoyne | H04L 43/08 709/224 |
| 2016/0103698 A1* | 4/2016 | Yang | G06F 11/202 714/4.11 |
| 2016/0124735 A1* | 5/2016 | Dingsor | G06F 8/60 717/177 |
| 2016/0142338 A1* | 5/2016 | Steinder | H04L 41/0813 709/226 |
| 2016/0147549 A1* | 5/2016 | Sivak | G06F 9/45558 718/1 |
| 2016/0154660 A1* | 6/2016 | Clark | G06F 9/50 718/1 |
| 2016/0212202 A1* | 7/2016 | Birkestrand | H04L 67/1008 |
| 2016/0226733 A1* | 8/2016 | Niemoeller | H04L 41/5067 |
| 2016/0269313 A1* | 9/2016 | Brooker | G06F 9/5072 |
| 2016/0301598 A1* | 10/2016 | Strijkers | H04L 12/66 |
| 2016/0357610 A1* | 12/2016 | Bartfai-Walcott | G06F 9/5027 |
| 2017/0024396 A1* | 1/2017 | Adarsh | G06Q 10/06 |

FOREIGN PATENT DOCUMENTS

| | | | | |
|---|---|---|---|---|
| CN | 103095804 | | 5/2013 | |
| DE | 102012217202 A1 | * | 4/2013 | G06F 9/5027 |
| EP | 2745248 A1 | * | 6/2014 | H04L 43/045 |
| JP | 2009140356 | | 6/2009 | |
| JP | 2013152553 | | 8/2013 | |
| KR | 10-2011-0034666 | | 4/2011 | |
| KR | 20110063637 A | * | 6/2011 | G06F 3/067 |
| WO | WO-2007053669 A2 | * | 5/2007 | B65D 39/0005 |
| WO | WO-2007147147 A2 | * | 12/2007 | G06F 30/392 |
| WO | WO-2009021060 A2 | * | 2/2009 | H04L 67/1034 |
| WO | 2010016104 | | 11/2010 | |
| WO | 2014073024 | | 5/2014 | |
| WO | WO-2014116678 A1 | * | 7/2014 | H04L 43/0817 |
| WO | WO-2014133524 A1 | * | 9/2014 | H04L 47/783 |

OTHER PUBLICATIONS

Strijkers et al., "Localizing and Placement of Network Node Functions in a Network", US Pub 20160301598, Google Publication, 2014.*

Techopedia, "Virtual Machine (VM)", 2017.*

Merriam-Webster, "evaluate", 2018.*

Merriam-Webster, "associate", 2018.*

Rochman et al., "Efficient Resource Placement in Cloud Computing and Network Applications", 2014 (Year: 2014).*

Rochman et al., "Resource Placement and Assignment in Distributed Network Topologies", 2013 (Year: 2013).*

Merriam-Webster, "prostective", 2021 (Year: 2021).*

Calcavecchia et al., "VM Placement Strategies for Cloud Scenarios", 2012 (Year: 2012).*

Gupta et al., "Optimizing VM Placement for HPC in the Cloud", 2012 (Year: 2012).*

Karve et al., "Dynamic Placement for Clustered Web Applications", 2006 (Year: 2006).*

Kwok et al., "Resource Calculations with Constraints, and Placement of Tenants and Instances for Multi-tenant SaaS Applications", 2008 (Year: 2008).*

(56) References Cited

OTHER PUBLICATIONS

Steiner et al., "Network-Aware Service Placement in a Distributed Cloud Environment", 2012 (Year: 2012).*

Vu Do et al., "Profiling Applications for Virtual Machine Placement in Clouds", 2011 (Year: 2011).*

Cooke et al., "Toward Understanding Distributed Blackhole Placement", 2004 (Year: 2004).*

Dabbagh et al., "Software-Defined Networking Security: Pros and Cons", 2015 (Year: 2015).*

Dictionary, "as a whole", 2021 (Year: 2021).*

Lakshmanan et al., "Placement Strategies for Internet-Scale Data Stream Systems", 2008 (Year: 2008).*

Li et al., "Energy efficient virtual machine placement algorithm with balanced and improved resource utilization in a data center", 2013 (Year: 2013).*

M3, "Placement Configuration", 2021 (Year: 2021).*

Microsoft Computer Dictionary, "configuration", 2021 (Year: 2021).*

Mell et al., NIST, "The Common Configuration Scoring System (CCSS): Metrics for Software Security Configuration Vulnerabilities", 2010 (Year: 2010).*

Stringer-Calvert et al., "Resource distribution and addressing", WO 2002035391 A1, 2002 (Year: 2002).*

Xu et al., "A Multi-objective Approach to Virtual Machine Management in Datacenters", 2011 (Year: 2011).*

Xu et al., "Multi-objective Virtual Machine Placement in Virtualized Data Center Environments", 2010 (Year: 2010).*

U.S. Appl. No. 14/658,941, filed Mar. 16, 2015, James Michael Thompson.

U.S. Appl. No. 14/643,906, filed Mar. 10, 2015, Christopher Magee Greenwood.

U.S. Appl. No. 13/053,469, filed Mar. 22, 2011, James Christopher Sorenson, et al.

U.S. Appl. No. 13/903,670, filed May 28, 2013, James Christopher Sorenson, et al.

Yuval Rochman, et al., "Resource Placement and Assignment in Distributed Network Topologies," Conference INFOCOM, 2013 Proceedings IEEE, pp. 1-9.

Yuval Rochman, et al., "Efficient Resource Placement in Cloud Computing and Network Applications," ACM vol. 42, Issue 2, Sep. 2014, pp. 1-3.

U.S. Appl. No. 14/661,627, filed Mar. 18, 2015, Christopher Magee Greenwood, et al.

Ajay Gulati et al., "Vmware Distributed Resource Management: Design, implementation, and lessons learned", vol. 1, No. 1, dated Mar. 1, 2012, pp. 45-64.

* cited by examiner

EVALUATING PLACEMENT CONFIGURATIONS FOR DISTRIBUTED RESOURCE PLACEMENT

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

Figure 1:
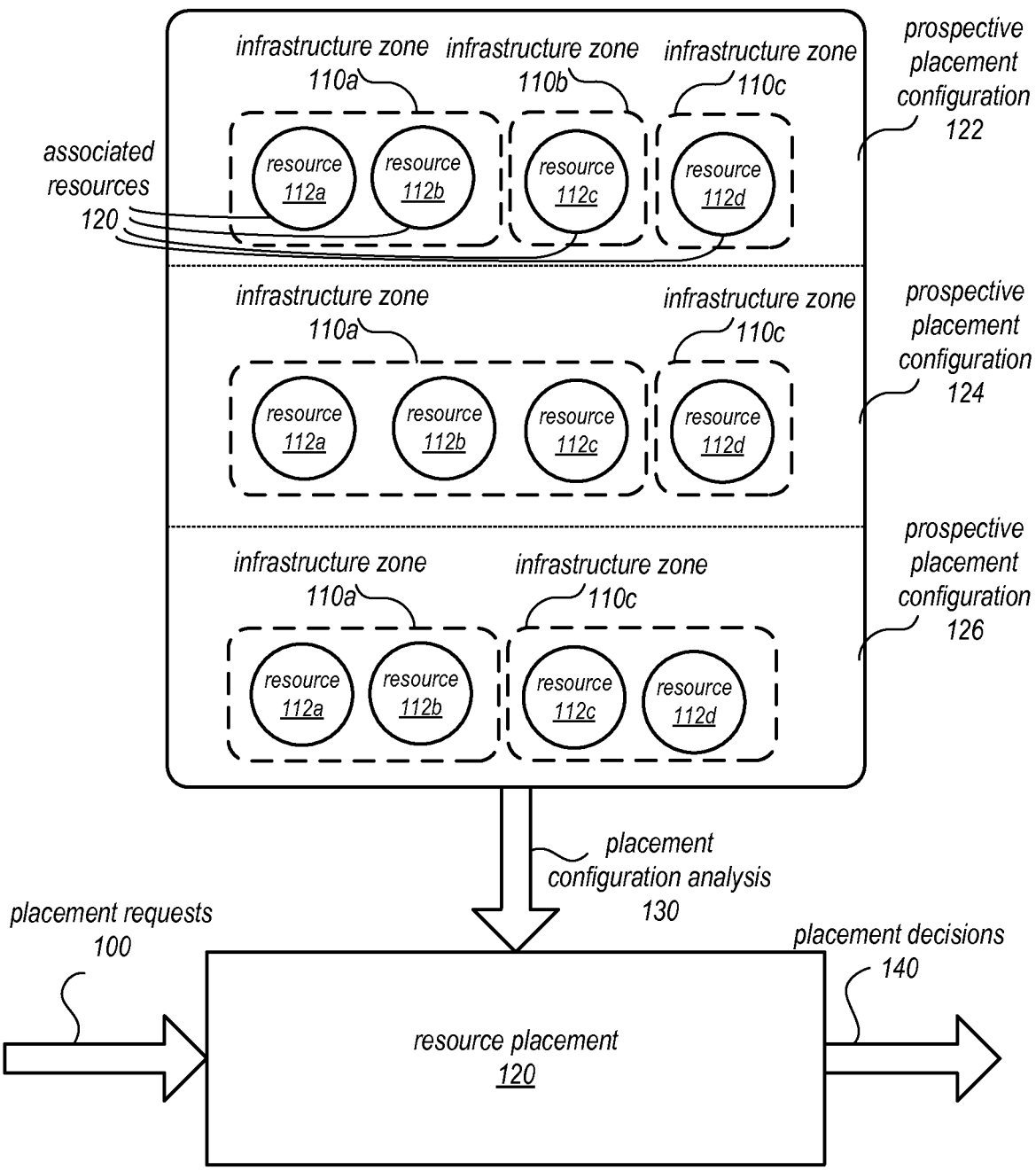
FIG. 1 illustrates a logical block diagram for evaluating placement configurations for distributed resource placement, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement evaluating placement configurations for distributed resource placement. Distributed systems may host various resources for performing or implementing different systems, services, applications and/or functions. Resources may be associated with other resources in the distributed system working, operating, or otherwise interacting together. In at least some embodiments, associated resources may implement a distributed resource. Resources may be one of many different types of distributed resources, such as one of various types of physical or virtualized computing resources, storage resources, or networking resources. For example, a storage service may host different replicas of data (e.g., a data volume) across a number of associated resources at resource hosts (e.g., providing a distributed storage resource that is a data volume). Associated resources may provide the same or different functionality, operations, interactions, or other tasks. Consider the data volume example given above, associated resources may include multiple replicas of the data volume, one of which may operate as a master replica performing certain functions, while other resources may be slave replicas of the data volume performing other functions. Alternatively, some resources may maintain different partitions of the data volume, in some embodiments, or perform different roles or tasks (e.g., some resources may provide front-end application processing while other resources may implement back-end processing for a distributed resource). In some embodiments, the associated resources may include a client (e.g., a virtual compute instance attached to the data volume).

Placement decisions may be made to locate resources of associated resources at different resource hosts in a distributed system. In order to provide or improve availability, durability, and/or other performance characteristics of associated resources, the locations at which resources are placed may be selected to achieve optimal placement configurations. For example, resources that share a common network zone, such as being hosted at servers connected to a same network router, may be optimal for providing high availability, as different communications may need to pass between the resources (e.g., in order to synchronize changes among replicas of a data volume). The placement of resources of associated resources at resource hosts often occurs individually, one resource at a time. Such placement techniques tend to evaluate the best location for the individual resource, without regard to the effect of the placement on the placement configuration of the associated resources as a whole. However, evaluating placement configurations of associated resources for resource placement, may make placement decisions that are less optimal from an individual resource perspective but achieve a more optimal placement configuration for the distributed resource overall.

For example, placing one resource in a same network availability zone (e.g., connected to the same network router) as another associated resource may appear to be more optimal from the perspective of the resource to be placed, as resource hosts in the same network availability zone may have the most available capacity to host the resource. However, if the other resources of the associated resources that also need to communicate with at least one of the two resources and are not located in the same network availability zone, then availability may be increased by locating the resource in a different network availability zone. If placement were limited to the optimal placement of the individual resource, then such increased availability may not be obtained for the associated resources, as placement optimized for the individual resource may select the same network availability zone. Distributed systems that implement evaluating placement configurations for distributed resource placement may recognize placements for individual resources that are optimal for the associated resources as a whole—not just individual resources.

FIG. 1 illustrates a logical block diagram for evaluating placement configurations for distributed resource placement, according to some embodiments. Resource placement 120 may provide placement decision making for placing resources of associated resources at different resource hosts of a distributed system. Resource hosts, which may be one or more computing systems, nodes, or devices (e.g., system 1000 in FIG. 8 below) may be configured to host or implement a resource of the distributed system. Placement requests 100 may be received to place or request a placement location for a resource of associated resources (e.g., that implement a distributed resource). Placement requests 100 may be received as part of an operation to create new associated resources at a distributed system, or as part of a migration operation to move a resource from one resource host to another, in some embodiments.

In response to receiving placement request(s) 100, resource placement 120 may perform a placement configuration analysis 130. Placement configuration analysis 130 may consider the effect of placement locations for a resource upon the placement configuration of the associated resources 120. Collective utilization metrics for the different placement configurations may be considered and optimized, in some embodiments. Other metrics, analyses, or calculations that optimize placement for the associated resources as a whole may be performed. Additional clients, nodes, or other actors with respect to associated resources may be considered as part of the configuration of the associated resources, such as the placement or location of a client that accesses/utilizes other resources of the associated resources. In at least some embodiments, evaluating prospective or possible placement configurations may include analyzing the prospective or possible configurations with regard to infrastructure zone localities.

For example, a placement request for a resource 112c of associated resources 120 is received. Different prospective or possible placement configurations may be evaluated. For example, prospective placement configuration 122 may place resource 112c at a resource host located within infrastructure zone 110b, whereas resources 112a and 112b are at resource hosts within infrastructure zone 110a and resource 112d is hosted within infrastructure zone 110c. Prospective placement configuration 124 may place resource 112c at a host within infrastructure zone 110a, while prospective placement configuration 126 may place resource 112 in infrastructure zone 110c along with resource 112d. Evaluating the prospective configurations that result from different possible placement locations for resource 112d may allow for a placement decision that optimizes the placement configuration for resource 120d as a whole. For example, it may be that resources 112a, 112b, and 112c perform frequent communication (e.g., coordinating the performance of changes to state information maintained across the associated resources), and resource 112d server as a backup resource, which may not be frequently accessed or communicated with. It may be that the prospective placement configuration 124 may be more optimal as co-location within infrastructure zone 110a (e.g., a network availability zone, such as a common network router or brick, data center room, or data center site) may provide more efficient communication. Alternatively, it may be more desirable to have resources distributed amongst as many infrastructure zones as possible, therefore prospective placement configuration 122 may be optimal.

An infrastructure zone may be a particular geographical, physical, or logical zone in which resource membership in or the location of a resource within the infrastructure zone may be determined. For example an infrastructure zone may be a zone related to network availability or topology (e.g., it takes the same number of network hops to reach resources within the infrastructure zone). An infrastructure zone may be identified by a particular device or system (e.g., hosts connected to a same network router, or brick, or power source may be in the same infrastructure zone). Infrastructure zones may vary in scope such that a resource host (and resources implemented on the resource host) may be within multiple different types of infrastructure zones, such as a particular network router or brick, a particular room location, a particular site, etc. Multiple infrastructure zone localities may be analyzed for prospective placement configurations. An infrastructure zone locality may be a determination of membership or location within a certain type of infrastructure zone (e.g., network router or brick locality).

Placement decisions 140 may be made based on the placement configuration analysis 130. For example, scores may be generated for possible placement locations for the resource based on the evaluation of the prospective placement configuration created as a result of the placement location. Placement scores may be weighted, combined, or otherwise manipulated in many different was in order to optimize placement for various distributed resource objectives.

Please note that previous descriptions are not intended to be limiting, but are merely provided as an example of evaluating placement configuration for distributed resource placement. Various components may perform resource placement. Different numbers or types of resources and infrastructure zones may be employed.

This specification begins with a general description of a provider network, which may implement evaluating placement configurations for distributed resource placement in resource placement for distributed resources offered via one or more network-based services in the provider network, such as data volumes offered via a block-based storage service. Then various examples of a block-based storage service are discussed, including different components/modules, or arrangements of components/module that may be employed as part of volume placement for data volumes in the block-based storage service. A number of different methods and techniques to implement evaluating placement configurations for distributed resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
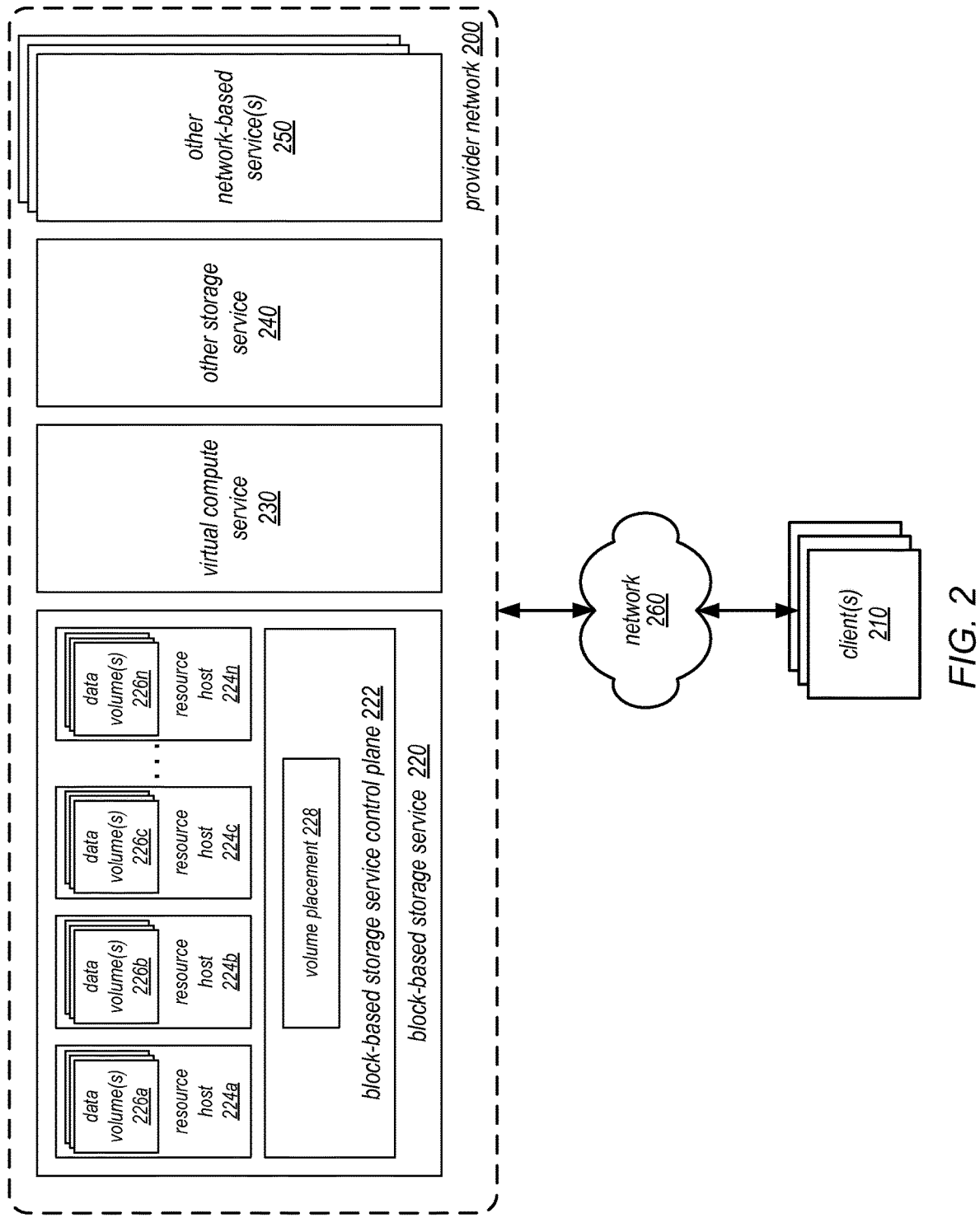
FIG. 2 is a block diagram illustrating a provider network implementing multiple network-based services including a block-based storage service that implements evaluating placement configurations for distributed resource placement, according to some embodiments.

FIG. 2 is a block diagram illustrating a provider network implementing multiple network-based services including a block-based storage service that implements optimizing for infrastructure diversity constraints in resource placement, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
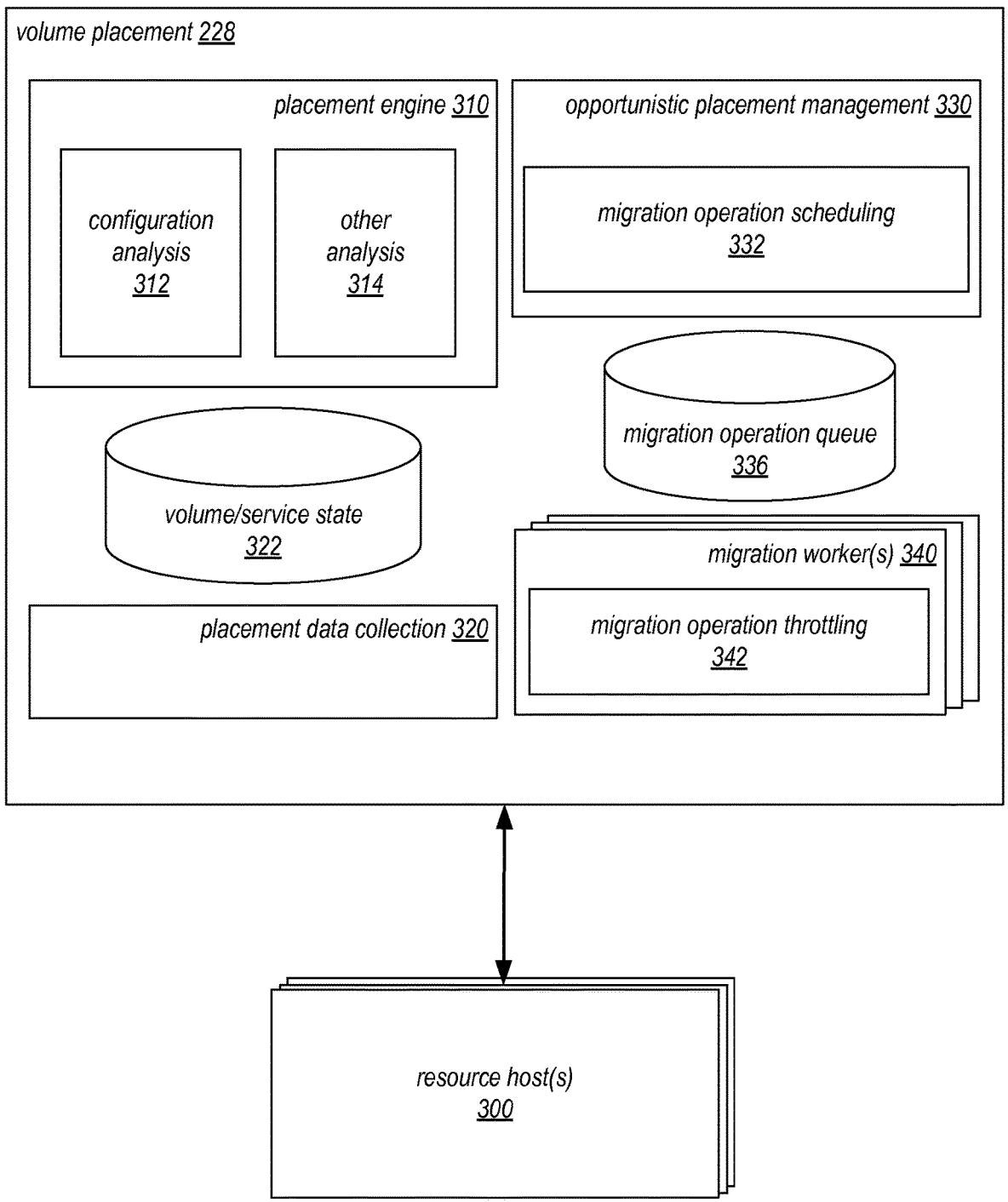
FIG. 3 is a logical block diagram illustrating volume placement that implements evaluating placement configurations for distributed resource placement, according to some embodiments.

FIG. 3 illustrating volume placement that implements evaluating placement configurations for distributed resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 10). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different resources associated with the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 10). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure zones, resources, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes (or partitions of new data volumes or currently placed data volumes). Analysis may be performed with respect to placement criteria, to determine placement locations which may be optimal for individual resources, or for the block-based storage service as a whole. For instance, placement engine 310 may implement configuration analysis 312 to evaluate prospective placement configurations of all of the resources in associated resources, such as the placement of master, slave(s) of a data volume. In some embodiments, a client or other user of a (or resource of the distributed resource) may be considered in the configuration analysis (e.g., evaluating the placement configuration including a virtual instance attached to a data volume as an associated resource). Configuration analysis 312 may consider the impact of migrating a currently placed resource to other resource hosts in order to free up space at resource hosts that would provide better configurations for other resources of different associated resources (e.g., move a slave volume to another host to make room for a different slave volume at the host which would be in the same infrastructure zone as a master of the volume or a client of the volume).

In response to receiving a placement request at placement engine 310, configuration analysis 312 may determine prospective placements by accessing volume/service state 322. Those resource hosts which are available, and which do not violate any placement constraints may be evaluated (e.g., two resources of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of associated resources, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis 312 upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, Input/Output Operations per second (IOPs), number of resources that may be hosted, location diversity, software configuration last time contacted, balance or ratio of resource utilization (e.g., utilized storage/utilize throughput vs. total storage/total throughput), and/or fragmentation effect (e.g., how much resource host waste is generated by a placement), may be evaluated for the data volume as a whole. Some data volumes, for instance, may be partitioned so that different resources maintain different portions of data for a data volume. For example, a data volume may be partitioned into 3 sets of master-slave replica pairs. Configuration analysis 312 may be performed based on the placement configuration for each portion of the data volume that is replicated (e.g., each master-slave replica pair) or all of the data volume resources (e.g., all 3 of the master-slave replica pairs).

Figure 4:
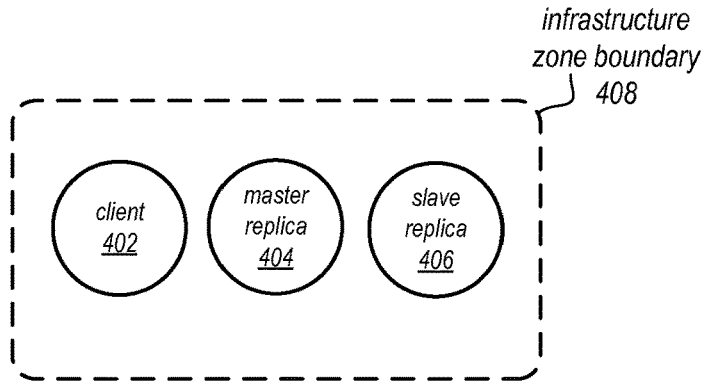
FIG. 4 is a logical block diagram illustrating different categories of an infrastructure zone locality, according to some embodiments.
Figure 4:
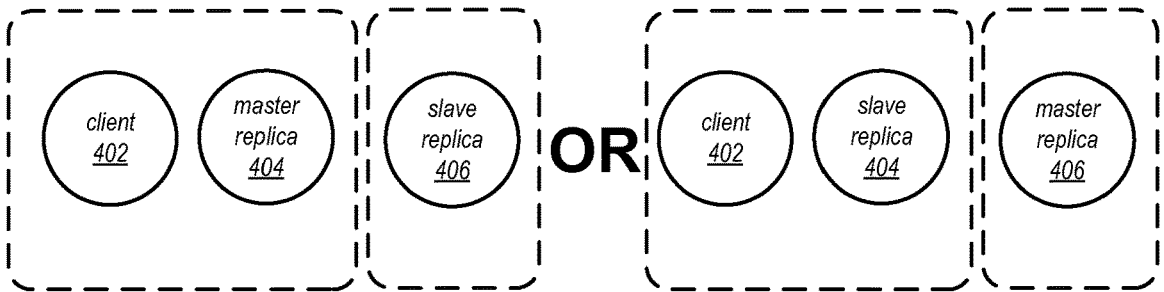
Figure 4:
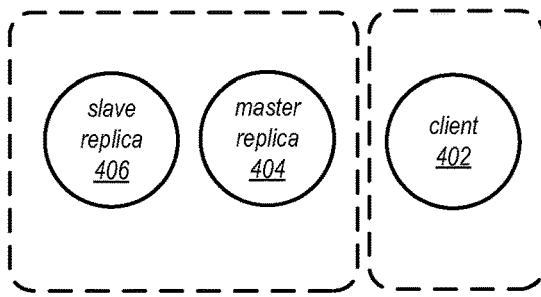
Figure 4:
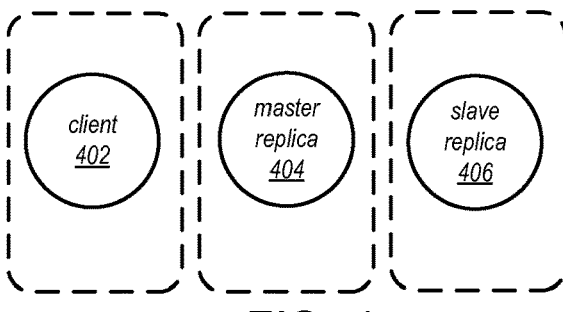

Different infrastructure zone locality categories may be defined. For example, as illustrated in FIG. 4, infrastructure zone locality category 410 may be defined as including prospective placement configurations where the client 402 (e.g., virtual computing instance), master replica 404 (e.g., of a data volume), and slave replica 406 (e.g., of a data volume) are located within the same infrastructure zone, such as within infrastructure zone boundary 408. Some categories may include multiple configurations, such as infrastructure zone locality category 420, where either the client 402 and master replica 404 are in a same infrastructure zone or a client and slave replica 404 are in a same infrastructure zone. For example, the infrastructure zone may be defined as those devices connected to the same network router, such that, in the first configuration of 420, client 402 and master replica 404 are connected to the same network router, and slave replica 406 is connected to a different network router. In the second configuration of 420, client 402 and slave replica 404 are connected to the same network router, master replica 406 is connected to a different network router. Some infrastructure zone locality categories may differ based on the type of resource. For example, categories 420 and 430 include the same number of infrastructure zones. However, infrastructure zone category 430 describes the scenario where the slave replica 406 and the master replica 404 are located within the same infrastructure zone (unlike the makeup of the infrastructure zones in category 420). Infrastructure zone locality category 440 describes the scenario where the client 402, master replica 404 and slave replica 406 each reside within different infrastructure zones.

Infrastructure zone locality categories may be used to prioritize or identify placement configurations that are optimal. For example, prospective configurations identified as category 410 placement configurations may be more desirable than other categories 420, 430, and 440. Thus, a higher score, priority, and/or weight may be assigned to a prospective placement configuration in category 410 than in other categories. Conversely, a particular category may be least desirable as compared to other categories and, thus, a lower score, priority, and/or weight may be assigned to a prospective placement configuration in that category. As noted above, placement configuration analysis with respective to infrastructure zone localities may optimize placement configurations of distributed resources, such as a data volume, for specific performance characteristics. For instance, category 440 may be more desirable than category 430 because master replica 404 and slave replica 406 may not be subject to common failure scenarios being located in different infrastructure zones so that in the event of failure limited to an infrastructure zone, either master replica 404 or slave replica 406 is likely to be available for client 402. In addition, the type of resource, such as a boot volume, may be considered in scoring possible configurations. For example, it may be desirable to place all boot volumes in category 410, because this configuration provides highest availability during network partitions as there are less number of network related failure points among them. As discussed below with regard to FIG. 6, multiple infrastructure zone localities may be analyzed. Thus, a prospective configuration may be in one category with respect to one infrastructure zone locality (e.g., network brick or router) and another category with respect to another infrastructure zone locality (e.g., data center room). Please note that the examples given above are not intended to be limiting. Different priorities may be given to the same or similar example categories discussed above.

Different priorities or weightings may be applied to categories for different infrastructure zone localities (e.g., network router locality scores may be weighted heavier than data center room locality scores). However, many different weighting or prioritization schemes may be implemented for infrastructure zone localities and their respective categories, and thus one category for one infrastructure zone locality may be weighted higher than a category in another infrastructure zone locality, while another category from the infrastructure zone locality may be weighted lower than a category from the other infrastructure zone locality.

Placement engine 310 may implement other analysis 314 to determine resource placements. For example, scores may be generated for placements based on the last time a particular resource host was contacted or heard from. Analysis may be performed to identify and prevent multiple master-slave replica pairs from being placed on the same two resource hosts. In some embodiments, resource host fragmentation analysis may be performed, to optimize placement of resources on resource hosts that can host the resource and leave the least amount of space underutilized. As with configuration analysis above, the example analysis given above may be performed to determine placement locations for some resources which if migrated would provide better placement of other resources that were not moved. For example, some migrations may be performed that place an individual resource in a worse placement location (as may be determined according to placement criteria), but may allow other migrations to be performed to improve placement in the distributed system overall. Various other predictive or long range placement optimizations may be performed by simulating different placement configurations for multiple different associated resources (e.g., resources for different data volumes) in order to improve placement in the distributed system overall, and thus the previous example is not intended to be limiting.

In some embodiments, volume placement 228 may implement opportunistic placement manager 330. Opportunistic placement management 330 may dynamically or proactively migrate currently placed resources (e.g., data volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource). For example, opportunistic placement manager 330 may implement migration operation scheduling 332 to request placements for resources from placement engine 310 that are determined to be placed sub-optimally (e.g., a lower scoring infrastructure zone category), such as discussed below with regard to FIGS. 6 and 7. Migration operation scheduling 332 may then determine which placements if performed would exceed a migration optimization threshold (e.g., a difference between a current placement score and new placement score). For those resources with possible placements that would exceed the placement optimization threshold, migration operation scheduling 332 may place a migration operation for the resource in migration operation queue 336. In some embodiments, migration operation scheduling 332 may assign a priority to migration operations, so that more beneficial migration operations are performed sooner.

The performance of migration operations to migrate resources from one resource host to another may be asynchronous. To coordinate the scheduling and/or performing of different migration operations, a scheduling structure or other data set may be maintained. In some embodiments, a queue of migration operations, such as migration operations queue 336 may be implemented. Migration operations queue 336 may be maintained in persistent storage, such as distributed or centralized data store. In at least some embodiments, a database system or other storage system that provides transaction controls may be utilized to maintain migration operation queue. For example, migration operation queue 336 may be maintained as a database table in another network-based service, such as a NoSQL data store implemented as part of other storage service 240. Migration operation scheduling 332 may update migration operation queue 400 periodically Various metadata and information for a migration operation may be maintained, such as a volume identifier, location of a destination host, state, time of last update, and/or priority value. Migration operation scheduling 332 may also remove migration operations from queue 336. Those migration operations that have not yet been performed may have updated priorities stored in the queue (e.g., raising or lowing the priority value). Time of last update may indicate when an update to the migration operation in the queue was last made. Priority values may be assigned to migration operations in order to schedule the migration operations opportunistically in queue 336. In at least some embodiments, migration operation queue 336 may be implemented as a priority queue, and thus the highest priority migration operation may be selected for performance.

Migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 310, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 310, networking device(s), router(s), switches, power source(s), or other component or device of a virtual block-based storage service may be evaluated with respect to the effect of performing the identified resource migration operation. Different migration limits (e.g., number of migration operations, network utilization, resource host utilization, etc.) may be enforced with respect to the infrastructure zones, in some embodiments. If the migration operation exceeds the limit for one of the different infrastructure zones, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with perform a migration, such as zones that include the current and destination resource hosts of a migration operation). In some embodiments, opportunistic placement management 330 may perform migration operation throttling in addition to, or in place of migration worker(s) 340.

In various embodiments, migration worker 340 may request an updated placement for a resource that is to be migrated from placement engine 310, which may perform the various techniques discussed above and below to provide a new placement location for the resource.

Figure 5:
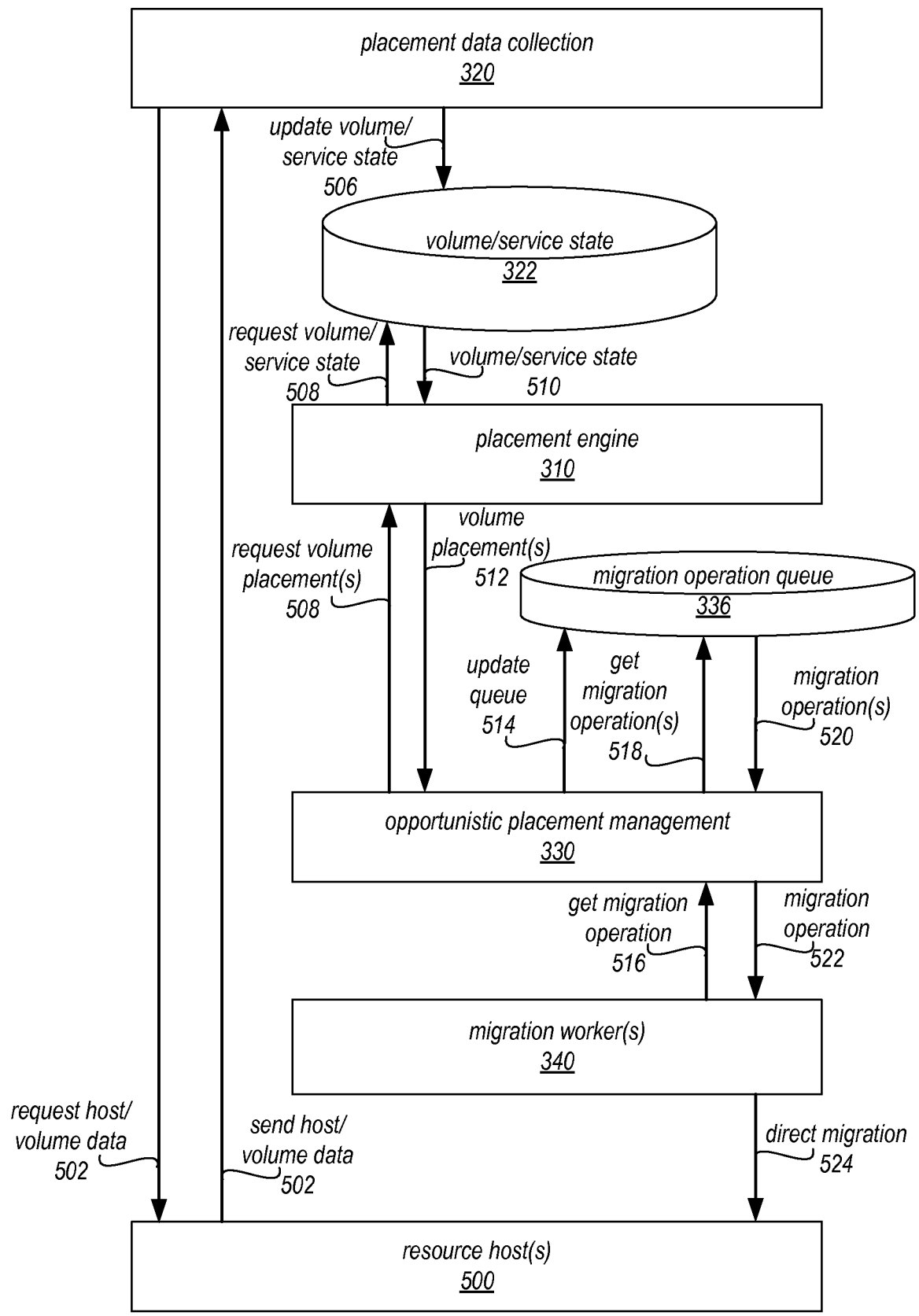
FIG. 5 is a logical block diagram illustrating interactions for migrating data volumes, according to some embodiments.

FIG. 5 is a logical block diagram illustrating interactions for migrating resources (e.g. replicas of data volumes), according to some embodiments. As discussed above, placement data collection 320 may sweep or request host/volume data 502 from resource host(s) 500 in order to update volume service state 322. Resource host(s) 502 may send host/volume data to placement data collection 320, which may aggregate and/or update volume/service state 506. Opportunistic placement management 330 may request volume placement(s) 508 from placement engine 310. Placement engine 310 may determine placement locations, such as according to the techniques described above with regard to FIG. 3. Volume placement(s) 512 may be provided to opportunistic placement management 330. For those volumes (or resources) that exceed the migration optimization threshold, migration operation queue 514 may be updated to add new migration operations. Stale or completed migration operations may be removed from the migration queue 336.

Migration worker(s) 340 may get migration operations 516 from opportunistic placement manager 330. Opportunistic placement manager 330 may evaluate migration operation queue 336 to get candidate migration operation(s) 518. The migration operation(s) 520 from the migration operation queue 336 may be returned 522 to migration worker(s) 340. Migration worker(s) 340 may then direct the migration operation 524 to affected resource host(s) 500. In some embodiments, migration worker(s) 340 may act as intermediaries, and may obtain the resource from an originating resource host before sending the resource to the destination resource host. The various interactions and illustrations provided in FIG. 5 may be communicated using various standard or customized communication techniques. For example, various internal APIs for placement engine 310, opportunistic placement management 330, migration operation queue 336, volume service state 322, resource host(s) 500, etc., may each have respective interfaces (e.g., programmatic interfaces such as an API), and the respective communications in FIG. 5 may be formatted accordingly.

Figure 6:
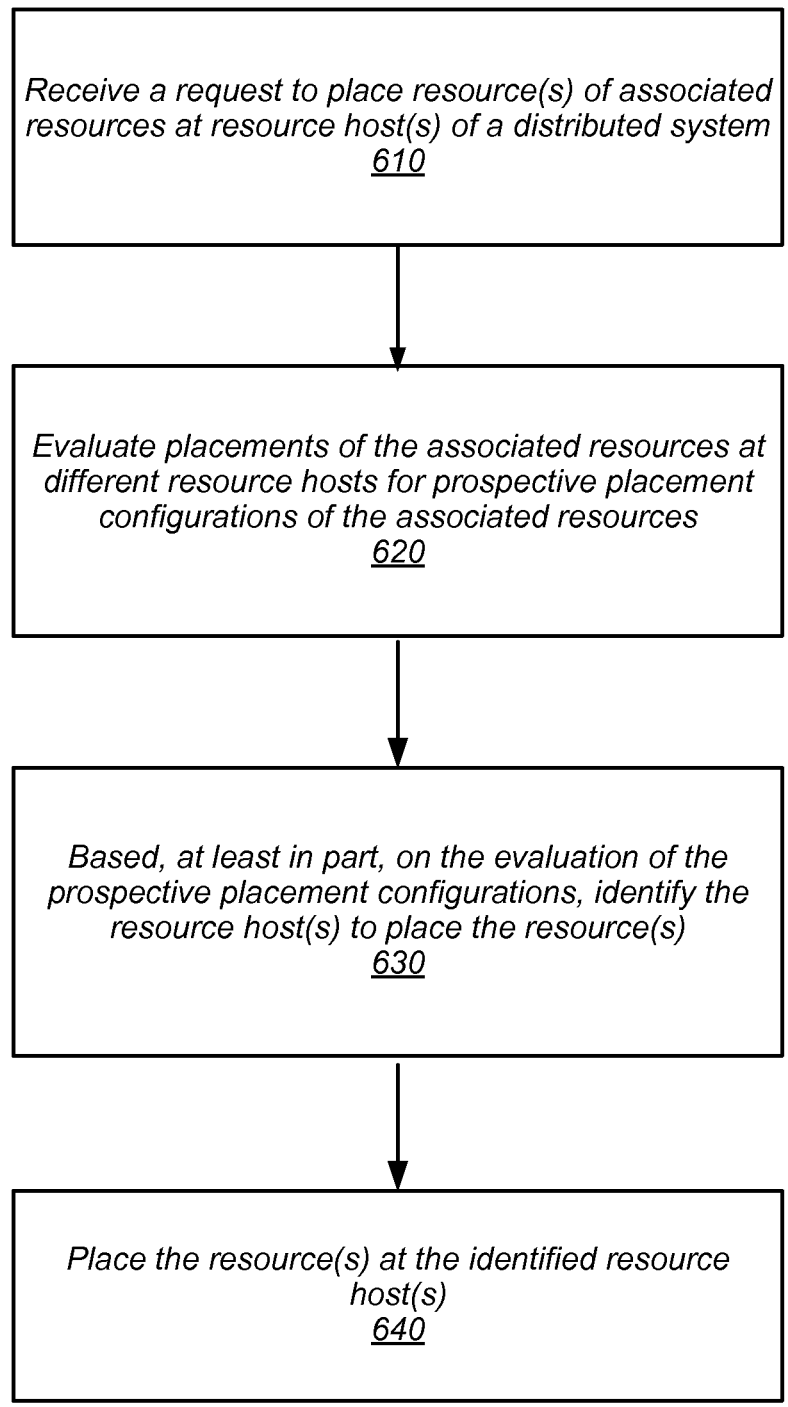
FIG. 6 is a high-level flowchart illustrating various methods and techniques for evaluating placement configurations for distributed resource placement, according to some embodiments.

The examples of evaluating placement configurations for distributed resource placement discussed above with regard to FIGS. 2-5 have been given in regard to a block-based storage service and/or other network-based services. Various other types or configurations of distributed systems placing resources of associated resources at resource hosts may implement these techniques. For example, a backup or archive distributed storage system may determine placements for resources of new data to archive or backup according to placement configurations that may provide a certain level of durability for the new data. Different configurations of the various modules, components, systems, and or services described above that may implement evaluating placement configurations for distributed resource placement may be configured to evaluate prospective placement configurations and select placements of resources according to the evaluation. FIG. 6 is a high-level flowchart illustrating various methods and techniques for evaluating placement configurations for distributed resource placement, according to some embodiments. These techniques may be implemented using a control plane, resource placement engine or other component for placing resources at resource hosts in a distributed system, as described above with regard to FIGS. 2-5.

Resources may be one of many different types of distributed resources, such as one of various types of physical or virtualized computing resources, storage resources, or networking resources. Associated resources may implement, operate, work together, and/or interact to perform many different tasks, services, applications, or functions. For example, a data volume of the block-based storage service described above with regard to FIGS. 2-5 may be associated data volume replicas such as a master replica and one or more replica slaves. Associated resources may individually perform different tasks or operations, store different data, or have different configurations, roles or characteristics. As indicated at 610, a request to place resource(s) of associated resources at resource host(s) may be received, in various embodiments. The request may be to place one or multiple ones of the associated resources (e.g., a master replica of a data volume, or multiple slave replicas of a data volume). The request may be received as part of a (or in response to) creation or other similar request to place new associated resources, such as a new distributed resource, at the distributed system. In another example, the request may be received to place an already existing resource of associated resources at one of the multiple resource hosts (or another resource host—e.g., from a system, node, or device external to the multiple resources, such as another data center, network, organization, and/or entity). The request may be received via an interface which may be of various types, including graphical and/or programmatic interfaces from a client of a distributed system, or other component, system, service, or device internal to the distributed system (e.g., a dynamic or automated migration system for placed resources, such as opportunistic placement manager 330).

As indicated at 620, in response to receiving the request, placements of the associated resources at different resource hosts for prospective (or possible) placement configurations of the associated resources may be evaluated. Prospective or possible placement configurations may include the resource(s) to be placed at different resource hosts to be evaluated, in various embodiments. Resource hosts that are available to host the resource(s) may be identified. For example, utilization, state, and other information about resource hosts may be searched to identify resource hosts that may host the resource. Some resource hosts may be filtered out of the available resource hosts due to a lack of capacity, capability (e.g., hardware and/or software configuration), or in violation of a placement constraint (e.g. server rack diversity between different resources). In at least some embodiments, a sub-set of resource hosts may be selected, and prospective placement configurations determined. A prospective placement configuration may identify placement locations (current or hypothetical) for all of the resources of a distributed resource. The resource(s) to be placed may be hypothetically placed at the identified available resource hosts. In at least some embodiments, different respective configuration scores, rankings, or other indications of preference may be determined for the prospective placement configurations. The configuration scores may be based on one or many different analysis or evaluations.

Figure 7:
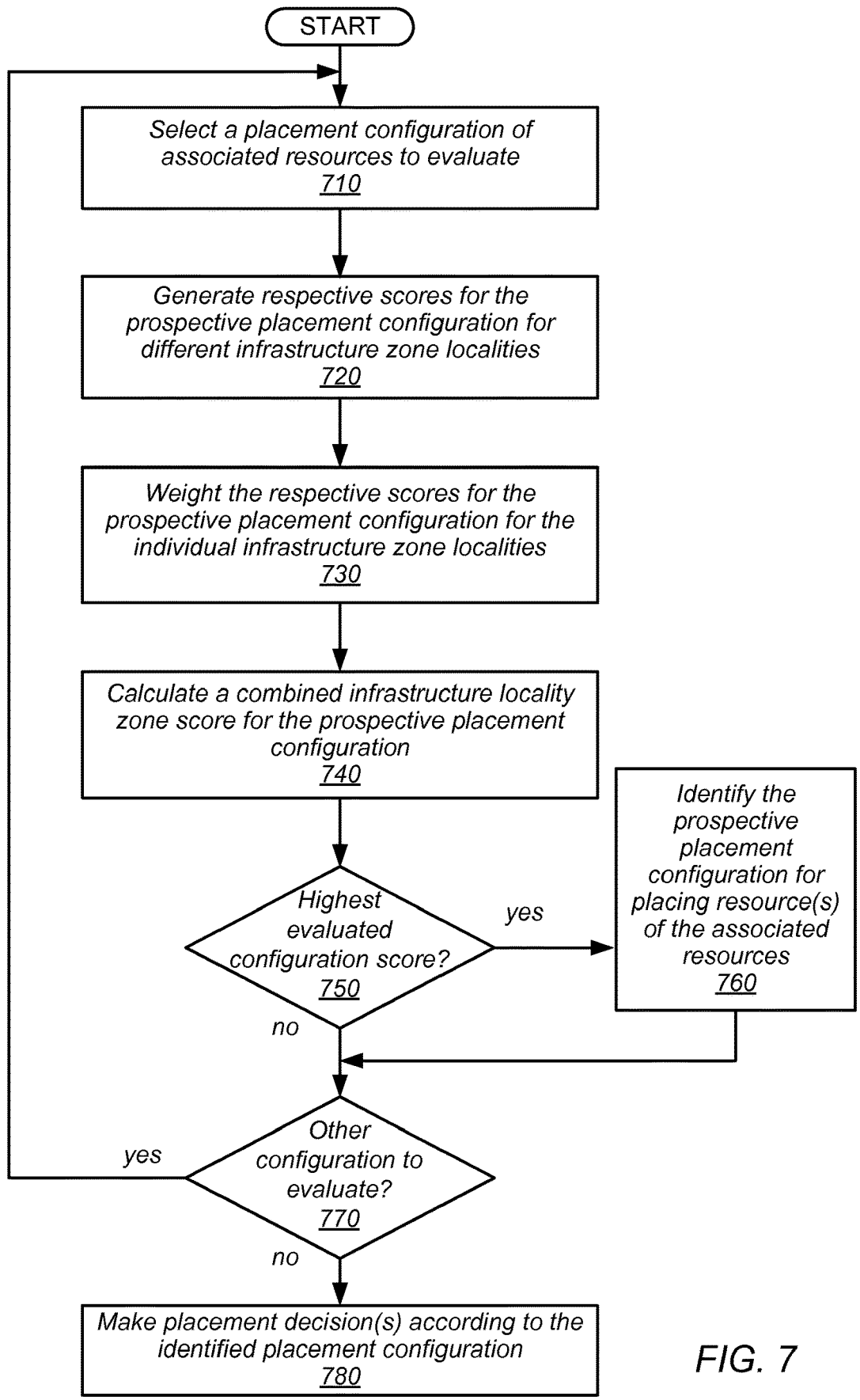
FIG. 7 is a high-level flowchart illustrating various methods and techniques for evaluating prospective placement configurations of associated resources to place a resource, according to some embodiments.

As discussed above with regard to FIGS. 1, 3 and 4, and below with regard to FIG. 7, in at least some embodiments, an analysis may be performed for the prospective placement configurations with respect to one or more infrastructure zone localities. For instance an infrastructure zone locality category may be identified for the prospective placement configurations. Other analysis may also be performed to generate the configuration score. For instance, in at least some embodiments, an analysis may be performed on prospective configurations with respect to different performance metrics of the resource hosts hosting the resources of a data volume. For example, storage capacity, workload, IOPs, number of resources that may be hosted, location diversity, software configuration last time contacted (e.g., last time a resource host was known to respond or send a communication), balance or ratio of resource utilization at resource hosts (e.g., utilized storage/utilize throughput vs. total storage/total throughput), and/or fragmentation effect on resource hosts (e.g., how much resource host waste is generated by a placement) may be evaluated for the associated resources as a whole. Placement scores, or other indicators of placement suitability may be generated, such as those discussed below with regard to FIG. 7, for prospective placement configurations.

As indicated at 630, based, at least in part, on the evaluation of the prospective placement configurations, the resource host(s) to place the resource(s) of the different resource hosts evaluated at element 620, may be identified. For example, the configuration scores may be used to select the resource host(s) of the highest scoring or ranked placement configuration. Such selections may be performed in many ways. Highest scoring or ranked placement configurations may be the highest scored or ranked configurations so far. Limitations may be made on the number of prospective configurations evaluated or considered if, for instance, a configuration has a highest possible or score that exceeds a maximally optimal placement threshold, then the further evaluation and identification of prospective configurations may cease. FIG. 7, discussed below, provides further examples of evaluating and identifying prospective placement configurations.

As indicated at 640, the resource(s) may then be placed at the identified resource host(s). For example, data may be transferred to the identified resource host(s), configuration operations may be performed at the resource host(s), or any other actions taken to host the resource(s) at the resource host(s). In some embodiments, resource hosts may be selected and tried for placement until the resource is successfully placed. In some embodiments, a current resource host maintaining the resource may be directed to transfer or remirror the resource to the identified resource host.

Infrastructure zone localities may have different scopes. For instance, two resources hosts that are in different infrastructure localities based on network router infrastructure zone locality may be in the same infrastructure zone locality based on data center room. In at least some embodiments, analyzing prospective placement configurations with respect to different infrastructure zone localities may allow for more fine-grained placement optimization for distributed resources. Additionally, identification of resource hosts based on evaluated prospective placement configurations may be performed in many ways. FIG. 7 is a high-level flowchart illustrating various methods and techniques for evaluating prospective placement configurations of a distributed resource to place a resource, according to some embodiments.

As indicated at 710, a placement configuration of associated resources may be selected for evaluation, in some embodiments. For instance, a set of possible placement configurations may be generated based on collected resource host data (such as discussed above with regard to FIGS. 3 and 6) to generate possible placement configurations. A placement configuration may be randomly chosen, in some embodiments, while in other embodiments, prospective configurations may be chosen based on difficulty in achieving (e.g., one migrations, two migrations, three placements, etc.).

As noted above, multiple infrastructure zone localities may be identified for analyzing prospective placement configurations. As indicated at 720, respective scores may be generated for a prospective placement configuration for different infrastructure zone localities. For instance, categories may be identified for the prospective placement configuration for network router locality, data center room locality, power source locality, and site locality. A score may be determined for each of the different infrastructure zone localities based on the identified category. As indicated at 730, the respective scores of the prospective placement configuration for the individual infrastructure zone localities may be weighted, in some embodiments. For example, more granular localities (e.g., network router) may be weighted higher than less granular localities (e.g., data center room or site). In some embodiments, the different scores of the different localities may be weighted based on the score (and thus the category for the different locality). For instance, a low score category for a network router category may weighted lower than a high score category for a data center room category when a high score category for the network router category may be weighted higher than the high score category for the data center room category. As indicated at 740, a combined infrastructure locality zone score may be calculated for the prospective placement configuration. The combined infrastructure locality zone score may still be combined with other scores from other analysis, in some embodiments, or may stand alone for placement decision making.

If the combined infrastructure locality score is the highest evaluated configuration score, as indicated by the positive exit from 750, then prospective placement configuration may be identified for placing resource(s) of the associated resources, as indicated at 760. For instance, the placement configuration may be the identified configuration unless replaced by a better scoring configuration. In some embodiments, if the prospective placement configuration exceeds some optimal placement threshold, then further evaluation of other prospective placement configurations may stop, as indicated by the negative exit from 770, and placement decision(s) may be made according to the identified placement configuration (e.g., as discussed above in FIG. 6), as indicated at 780. In some embodiments, a limitation may be enforced on the number prospective placement configurations evaluated (e.g., 1000), and thus if the number is exceeded, then the identified placement configuration at 760 may be used (even if better placement configurations could exist). Alternatively, if the maximum number of evaluations has not been exceeded, or an optimal placement threshold exceeded, then more prospective placement configurations may be evaluated, as indicated by the positive exit from 770.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
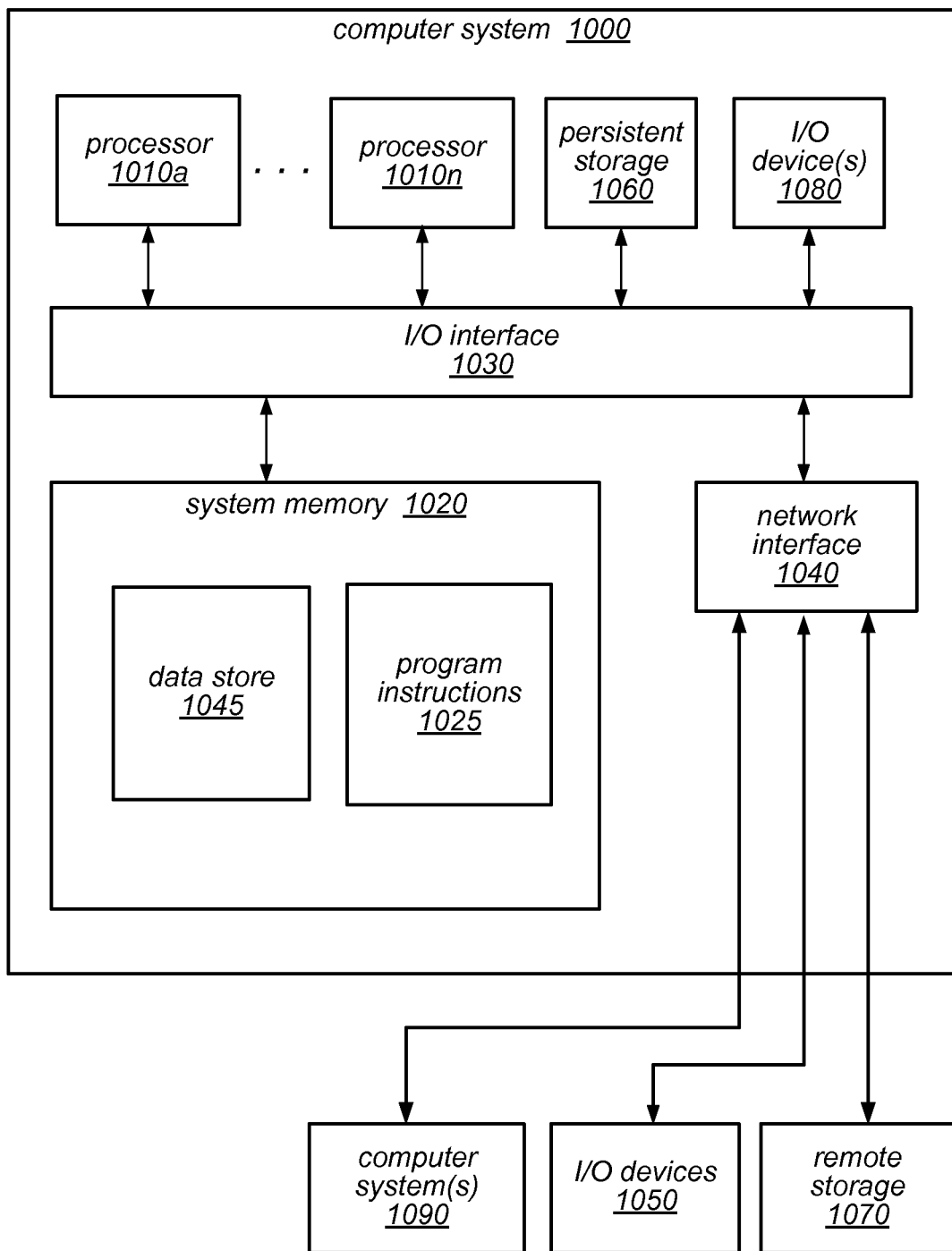
FIG. 8 is a block diagram illustrating an example computing system, according to some embodiments.

Embodiments of optimizing for infrastructure diversity constraints in resource placement as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of resource hosts in the distributed system;
one or more computing devices, each with a respective at least one processor and memory, to implement a resource placement engine for the distributed system, the resource placement engine configured to:
receive a placement request to locate one or more resources of a plurality of associated resources at one or more of the plurality of resource hosts in the distributed system, wherein locations of each of the plurality of associated resources are determined by the resource placement engine;
in response to the receipt of the request:
determine a plurality of prospective placement configurations, each indicating respective prospective placements for each of the plurality of associated resources at respective hosts of the resource hosts, wherein the indicated respective prospective placements for each of the associated resources vary among the plurality of prospective placement configurations;
select a placement configuration from among the plurality of prospective placement configurations based, at least in part, on respective configuration scores calculated for the plurality of prospective placement configurations, wherein to calculate a respective configuration score for a particular prospective placement configuration the resource placement engine is configured to evaluate, as a whole, the indicated prospective respective placements of the plurality of associated resources at the respective hosts of the resource hosts for the particular prospective placement configuration;
identify the respective hosts of the plurality of resource hosts to place the one or more resources based at least in part on the selected placement configuration; and
cause placement of the one or more resources at the identified respective hosts of the plurality of resource hosts.

2. The system of claim 1, wherein to evaluate the prospective placements of the associated resources at the respective hosts of the resource hosts, the resource placement engine is configured to analyze one or more infrastructure zone localities of the prospective placement configurations.

3. The system of claim 1, further comprising:
at least one other computing device, each with another respective at least one processor and memory, to implement a resource migration worker, configured to:
send the request for the placement of the one or more resources to the placement engine;
receive an indication of the one or more resource hosts identified to place the one or more resources; and
initiate a migration operation to migrate the one or more resources to the identified one or more resource hosts.

4. The system of claim 1,
wherein the distributed system is a provider network that implements a virtual block-based storage service and a virtual computing service,
wherein the one or more resources are data volumes of the virtual block-based storage service for a client of the provider network,
wherein a virtual compute instance of the virtual computing service is attached to the data volume, and
wherein the virtual compute instance is another one of the associated resources.

5. A method, comprising:
performing, by a resource placement engine comprising one or more computing devices:
receiving a request to place one or more resources of a plurality of associated resources at respective hosts of a plurality of resource hosts of a distributed system, wherein locations of each of the plurality of associated resources are determined by the resource placement engine;
in response to receiving the request:
determining a plurality of prospective placement configurations each indicating respective prospective placements for each of the plurality of associated resources at the respective hosts of the plurality of resource hosts, wherein the indicated respective prospective placements for each of the associated resources vary among the plurality of prospective placement configurations;

selecting a placement configuration from among the plurality of prospective placement configurations based, at least in part, on respective configuration scores calculated for the plurality of prospective placement configurations, wherein calculating a configuration score for a particular placement configuration comprises evaluating, as a whole, the indicated respective prospective placements of each of the plurality of associated resources at the respective hosts of the plurality of resource hosts for the particular prospective placement configuration;

identifying the respective hosts of the plurality of resource hosts to place the one or more resources based at least in part on the selected placement configuration; and placing the one or more resources at the identified respective hosts of the plurality of resource hosts.

6. The method of claim 5, wherein evaluating the indicated respective prospective placements of each of the plurality of associated resources at the respective hosts of the resource hosts comprises, at least in part, analyzing one or more infrastructure zone localities of the placement configurations.

7. The method of claim 6,
wherein the one or more infrastructure zone localities are a plurality of infrastructure zone localities, and
wherein analyzing the one or more infrastructure zone localities of the prospective placement configurations comprises:
for a given prospective placement configuration of the prospective placement configurations:
generating, for the given prospective placement configuration, respective scores for the one or more infrastructure zone localities;
weighting the respective scores for the given prospective placement according to a priority scheme for the one or more infrastructure zone localities; and
calculating a combined infrastructure zone locality score for the given prospective placement configuration.

8. The method of claim 6, wherein the one or more infrastructure zone localities are network zone localities.

9. The method of claim 5, wherein evaluating the respective prospective placements of the plurality of associated resources at the respective hosts of the resource hosts comprises analyzing the prospective placement configurations with respect to one or more resource utilization metrics for the plurality of resource hosts.

10. The method of claim 5, wherein the resource is a data volume or replica of the data volume.

11. The method of claim 5, wherein the request to place the one or more resources is received as part of creating the associated resources at the distributed system.

12. The method of claim 5, wherein the request to place the one or more resources is received as part of a migration operation for the one or more resources.

13. The method of claim 5, wherein the distributed system is a network-based service and wherein the associated resources are a distributed resource implemented for a client of the network-based service.

14. A non-transitory, computer-readable storage medium, storing program instructions that when executed by one or more computing devices cause the one or more computing devices to implement a resource placement engine to perform:

receiving a request to place one or more resources of a plurality of associated resources at respective ones of a plurality of resource hosts of a distributed system,
wherein locations of each of the plurality of associated resources are determined by the resource placement engine;

in response to receiving the request:
determining a plurality of prospective placement configurations each indicating respective prospective placements for each of the plurality of associated resources at respective hosts of the plurality of resource hosts, wherein the indicated respective prospective placements for each of the associated resources vary among the plurality of prospective placement configurations;

selecting a placement configuration from among the plurality of prospective placement configurations based, at least in part, on respective configuration scores calculated for the plurality of prospective placement configurations, wherein calculating a configuration score for a particular prospective placement configuration comprises evaluating, as a whole, the indicated respective prospective placements of each of the plurality of associated resources at the respective hosts of the plurality of resource hosts for the particular prospective placement configuration;

identifying the respective hosts of the plurality of resource hosts to place the one or more resources based at least in part on the selected placement configuration; and causing placement of the one or more resources at the identified respective hosts of the plurality of resource hosts.

15. The non-transitory, computer-readable storage medium of claim 14, wherein, in evaluating the respective prospective placements of each of the plurality of associated resources at the respective hosts of the resource hosts, the program instructions cause the one or more computing devices to implement analyzing one or more infrastructure zone localities of the prospective placement configurations.

16. The non-transitory, computer-readable storage medium of claim 15,
wherein the one or more infrastructure zone localities are a plurality of infrastructure zone localities, and
wherein, in analyzing the one or more infrastructure zone localities of the prospective placement configurations, the programming instructions cause the one or more computing devices to implement:
for a given prospective placement configuration of the prospective placement configurations:
generating, for the given prospective placement configuration, respective scores for the infrastructure zone localities;
weighting the respective scores for the given prospective placement according to a priority scheme for the infrastructure zone localities; and
calculating a combined infrastructure zone locality score for the given prospective placement configuration.

17. The non-transitory, computer-readable storage medium of claim 16, wherein the one or more infrastructure zone localities are respective power sources.

18. The non-transitory, computer-readable storage medium of claim 16,
- wherein the associated resources comprise a master replica of a data volume, one or more slave replicas of the data volume, and a client of the data volume,
- wherein the priority scheme includes categories comprising at least two of:
    - a first locality category that includes the client, the master replica and the one or more slave replicas located in a same infrastructure zone;
    - a second locality category that includes the client and the master replica located in the same infrastructure zone or the client and the one or more slave replicas in the same infrastructure zone;
    - a third locality category that includes the master replica and the one or more slave replicas in the same infrastructure zone; or
    - a fourth locality category that includes the master replica, the one or more slave replicas, and a client replica in different infrastructure zones.

19. The non-transitory, computer-readable storage medium of claim 14, wherein at least some of the associated resources are partitions of a data volume.

20. The non-transitory, computer-readable storage medium of claim 19, wherein the distributed system is a virtual block-based storage service.

\* \* \* \* \*